United States Patent Office 2,943,075
Patented June 28, 1960

2,943,075

STYRENE-MODIFIED RUBBERY COMPOSITIONS AND STABILIZED WITH 2-NITROPHENOLS

William K. Schweitzer, Jr., Midland, Mich., assignor to The Dow Chemical Company, Midland, Mich., a corporation of Delaware No Drawing. Filed July 2, 1956, Ser. No. 595,064

2 Claims. (Cl. 260—45.5)

This invention concerns compositions of matter comprising essentially a polymeric body containing a predominant amount of a polymerized vinyl aromatic compound and a minor amount of a rubber or a rubbery elastomer and certain 2-nitrophenols as stabilizing agents for inhibiting the polymers against the embrittling or deteriorating effects of exposure to light or heat and oxygen.

It is known that vinyl aromatic polymers, e.g. polystyrene, undergo physical change upon prolonged exposure to light or heat in the presence of air or oxygen. The observable symptoms of such change are discoloration or embrittlement, or both, due in varying measure to the action of light or heat and oxygen with resultant deterioration of the mechanical properties of the polymers and their appearance.

It is known that natural or synthetic rubbers undergo changes upon prolonged exposure to light or heat and air or oxygen, due in varying measure to the oxygen content of the atmosphere in which they are exposed, the temperature and the presence or absence of sunlight. The observable symptoms of such changes are embrittlement with resulting deterioration of the properties of the rubber.

Compositions or polymeric bodies consisting essentially of a predominant amount of a polymerized vinyl aromatic compound and a minor amount of natural or a synthetic rubber intimately incorporated with one another are becoming of increasing interest as molding compositions having improvement in one or more of the mechanical properties tensile strength, impact strength or percent elongation. Since the uses of such compositions include the manufacture of molded articles, films, foils, rods, etc., embrittlement or deterioration which results in lowering of the properties of the composition is to be avoided. The provision of stabilized compositions of matter comprising essentially a thermoplastic polymeric body containing in chemically combined form a predominant amount of a monovinyl aromatic compound with a minor amount of natural or a synthetic rubber is the principal object of the invention.

According to the invention the foregoing object is attained by intimately incorporating with a polymeric body consisting essentially of a predominant amount of at least one chemically combined vinyl aromatic hydrocarbon and a minor amount of natural rubber or a synthetic rubber, a small amount, e.g. from 0.5 to 5 percent by weight of the composition, of a nitrophenol having the general formula:

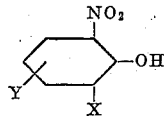

wherein one of the symbols X and Y represents a member of the group consisting of hydrogen, the nitro radical (—NO₂) and alkyl radicals and the other represents a member of the group consisting of hydrogen, cyclohexyl and alkyl radicals containing from 1 to 8 carbon atoms.

It is important that the nitrophenol to be employed as stabilizing agent for the composition contain at least one substituent nitro radical attached to a carbon atom of the benzene nucleus ortho to the carbon atom containing the hydroxyl group in order to stabilize or inhibit the composition against the embrittling effects of prolonged exposure to light or heat and oxygen and the resulting deterioration of the polymer. The 2-nitrophenols embraced by the above formula can be employed in amounts of from 0.5 to 5, preferably from 0.5 to 2, percent by weight of the composition. Lesser amounts, e.g. 0.1 percent by weight, of the 2-nitrophenols are ineffective to stabilize the compositions. Greater amounts of the stabilizing agent than herein specified can be used, but are not required. Articles made from the compositions show little tendency to undergo embrittlement or lowering of the mechanical properties, e.g. the percent elongation, upon prolonged exposure to light rich in ultraviolet rays in the presence of air or oxygen.

Nitrophenols having the nitro radical in a position other than ortho to the hydroxyl group, e.g. 4-nitrophenol, have been found to provide little or no stabilizing action for the compositions when tested under otherwise similar conditions.

Vinyl aromatic polymers which can be employed in the compositions are the resinous thermoplastic polymers of any one or more polymerized monovinyl aromatic hydrocarbons of the benzene series such as styrene, vinyltoluene, vinylxylene, ethylvinylbenzene, isopropylstyrene, tert.-butylstyrene, ethylvinyltoluene, etc., or copolymers of at least 70 percent by weight of any one or more of such monovinyl aromatic hydrocarbons and not more than 30 percent of a monoethylenically unsaturated organic compound copolymerizable therewith, e.g. acrylonitrile, alpha-methyl styrene, or esters of acrylic or methacrylic acid such as ethyl acrylate or methylmethacrylate. The vinyl aromatic polymers are employed in amounts corresponding to from 60 to 98, preferably from 70 to 95 percent by weight of the composition.

The rubber to be employed in the composition can be natural rubber or a synthetic rubber such as rubbery copolymers containing in chemically combined form from 40 to 80 percent by weight of butadiene and from 60 to 20 percent of styrene, rubbery copolymers of from 65 to 90 percent by weight of butadiene and from 35 to 10 percent of acrylonitrile or homopolymers of butadiene, i.e. polybutadiene. The rubber can be employed in amounts such that the total amount of rubber or elastomer corresponds to from 2 to 40, preferably from 5 to 35 percent by weight of the composition.

The polymeric bodies to be stabilized can be prepared in usual ways, e.g. by heat-plastifying the vinyl aromatic polymer on compounding rolls, in a Banbury mixer or a plastics extruder, and incorporating the rubber therewith, or by dissolving the rubber in monomers and heating the solution in bulk to polymerize the monomer and obtain a polymeric body. Polymeric bodies which are copolymers of at least 85 percent by weight of one or more monovinyl aromatic hydrocarbons and not more than 15 percent of natural or a synthetic rubber such as rubbery copolymers of butadiene and styrene, butadiene and acrylonitrile or polybutadiene, which rubber is soluble in monomeric styrene can be prepared by polymerizing a solution of the rubber dissolved in monomer.

The stabilized compositions of the invention can be prepared by heat-plastifying the polymeric materials on compounding rolls, in a Banbury mixer or plastics extruder and intimately blending or incorporating the 2- nitrophenol stabilizing agent therewith in the desired proportion to obtain a uniform composition.

In practice wherein the polymeric material to be stabilized is a blend or intimate mixture of a vinyl aromatic polymer and a rubber as previously described, the 2-nitrophenol stabilizing agent is preferably intimately incorporated with the rubber component and the rubber containing the stabilizing agent then incorporated with the vinyl aromatic polymer to obtain a final composition.

Small amounts of additives such as dyes, colors, pigments, plasticizers, flow agents, lubricants, antioxidants, etc., can be incorporated with the compositions, if desired, but the addition of such additives is not required. When used, the additives are usually employed in amounts corresponding to from 0.1 to 10 percent by weight of the composition. The rubber, e.g. GR-S synthetic rubber, may advantageously contain a small amount of an antioxidant to prevent deterioration of the rubber prior to its intended use.

The following examples illustrate ways in which the principle of the invention has been applied, but are not to be construed as limiting its scope.

EXAMPLE 1

In each of a series of experiments, a charge of 298.5 grams of a resinous polymer containing in chemically combined form 95 percent by weight of styrene and 5 percent of a rubbery copolymer of about 76.5 percent by weight of butadiene-1,3 and 23.5 percent of styrene (GR-S 1006 rubber), which polymer was prepared by dissolving the rubber in monomeric styrene to form a solution containing 5 percent by weight of the rubber and heating the solution to polymerize the monomers, was heat-plastified by milling the same on a pair of laboratory rolls heated at 340° F. and 230° F., respectively. Thereafter, 1.5 grams of a 2-nitrophenol as identified in the following table was added and intimately incorporated with the polymer by milling the heat-plastified materials together over a period of about ten minutes. The composition was removed from the rolls, was allowed to cool and was cut to a granular form. Portions of the product were injection molded to form test bars having the dimensions ⅛ x ½ inch by 4 inches long. Part of the test bars were used to determine a percent elongation value for the composition as initially prepared employing procedure similar to that described in ASTM D638–49T. Other of the test bars were exposed to rays from an S–4 Sunlamp (General Electric Company) for a period of 24 hours in air, then were tested to determine a percent elongation value for the composition after exposure to the light. The difference in the percent elongation of the composition before and after exposure to light represents a measure of the stabilizing action of the 2-nitrophenol agent to inhibit deterioration of the polymer. Table I identifies the experiments and names the compound employed as stabilizing agent. The table also gives a percent elongation value for the composition before and after exposure to the light and the percent elongation retained after exposure.

*Table I*

| Run No. | Stabilizing Agent | Elongation | | |
|---|---|---|---|---|
| | | Before Exposure, Percent | After Exposure, Percent | Retention, Percent |
| 1 | None | 23.5 | 4.8 | 20.4 |
| 2 | 2-Nitrophenol | 21.2 | 11.0 | 51.9 |
| 3 | 2-Nitro-4-tert.-butylphenol | 25.6 | 17.2 | 67.2 |
| 4 | 2-Nitro-4-tert.-octylphenol | 25.2 | 17.4 | 69.0 |
| 5 | 2-Nitro-4,6-tert.-butylphenol | 25.8 | 15.9 | 61.7 |

EXAMPLE 2

In each of a series of experiments, a resinous polymer of 95 percent by weight of styrene and 5 percent of GR–S 1006 rubber as described in Example 1, was heat-plastified and intimately mixed with a dinitrophenol as identified in the following table, in amount corresponding to 0.5 percent by weight of the final composition, employing procedure similar to that employed in Example 1. The compositions were injection molded to form test bars and were tested by procedures similar to those employed in Example 1. Table II identifies the experiments, names the dinitrophenol compound employed as stabilizing agent and gives the elongation values for the composition before and after exposure of test bars to light and gives the percent of elongation retained.

*Table II*

| Run No. | Stabilizing Agent | Elongation | | |
|---|---|---|---|---|
| | | Before Exposure, Percent | After Exposure, Percent | Retention, Percent |
| 1 | 2,4-Dinitrophenol | 22.7 | 8.6 | 37.9 |
| 2 | 2,6-Dinitrophenol | 25.3 | 10.5 | 41.5 |
| 3 | 2,4-Dinitro-6-methylphenol | 21.1 | 10.9 | 52.0 |
| 4 | 2,6-Dinitro-4-cyclohexylphenol | 21.1 | 10.9 | 52.0 |
| 5 | 2,6-Dinitro-4-sec.-butylphenol | 18.1 | 10.4 | 57.5 |
| 6 | 2,6-Dinitro-4-tert.-butylphenol | 23.2 | 15.0 | 64.6 |

EXAMPLE 3

In each of a series of experiments, polystyrene having a viscosity characteristic of 40 centipoises, determined on a 10 weight percent solution of the polystyrene in toluene at 25° C., was heat-plastified and milled on a pair of laboratory rolls, one of which rolls was heated at a temperature of 340° F. and the other at 240° F., then compounded with a rubbery copolymer of 70 percent by weight of butadiene and 30 percent of styrene containing 10 percent of 2-nitrophenol as stabilizing agent, to obtain a uniform composition. Portions of the composition were injection molded to form test pieces having the dimensions ⅛ x ½ inch by 4 inches long. Part of the test pieces were used to determine a percent elongation value for the composition as initially prepared, employing procedure similar to that described in ASTM D638–49T. Other of the test pieces were exposed to rays from an S–4 Sunlamp (General Electric Company) for a period of 24 hours in air, then were tested to determine a percent elongation value for the composition after exposure to the light. Table III identifies the experiments by giving the proportions in percent by weight of the polystyrene and rubbery copolymer employed in making the composition. The table also gives the percent elongation of the composition as initially prepared, after exposure to light and the retention of elongation in percent.

*Table III*

| Run No. | Starting Materials | | Product—Elongation | | |
|---|---|---|---|---|---|
| | Polystyrene, Percent | Rubbery Copolymer, Percent | Initial, Percent | Final, Percent | Retention, Percent |
| 1 | 95 | 5 | 12.2 | 12.5 | 100+ |
| 2 | 90 | 10 | 18.8 | 18.4 | 97.9 |
| 3 | 80 | 20 | 38.0 | 25.0 | 67.5 |
| 4 | 65 | 35 | 24.7 | 17.2 | 69.6 |

EXAMPLE 4

In each of a series of experiments, a resinous copolymer of 95 percent by weight of styrene and 5 percent of GR–S 1006 rubber as described in Example 1, was heat-plastified and intimately mixed with a nitrophenol in amount and kind as stated in the following table. Portions of the compositions were injection molded to form test pieces which were used to determine the stabilizing action of the nitrophenol for inhibiting the deterioration of the composition upon exposure to light employing procedures similar to those employed in Example 1. Table IV names the nitrophenol employed as stabilizing agent and gives the amount of said agent in percent based on the weight of the composition. For purpose of comparison, the results of experiments using 4-nitrophenol and 2-nitrophenol in an amount outside the scope of the invention, are included in the table.

Table IV

| Run No. | Stabilizing Agent | | Elongation | | |
|---|---|---|---|---|---|
| | Kind | Percent | Initial, Percent | Final, Percent | Retention, Percent |
| 1 | None | 0.0 | 26.4 | 4.9 | 18.5 |
| 2 | 4-Nitrophenol | 0.5 | 24.1 | 5.7 | 23.5 |
| 3 | 2-Nitrophenol | 0.1 | 25.4 | 6.2 | 24.5 |
| 4 | do | 0.5 | 23.5 | 10.9 | 46.4 |
| 5 | do | 1.0 | 22.8 | 14.2 | 62.2 |
| 6 | do | 5.0 | 21.6 | 11.0 | 50.9 |

EXAMPLE 5

In each of a series of experiments, a polymer as identified in the following table, was heat-plastified and milled with GR-S 1006 rubber to obtain a uniform composition, then was compounded with 0.5 percent by weight of 2,4-dinitrophenol as stabilizing agent. The composition was injection molded to form test bars which were employed to determine an elongation value for the composition and the stabilizing action of the 2,4-dinitrophenol for inhibiting deterioration of the polymeric product upon exposure to light employing procedures similar to those employed in Example 1. Table V identifies the experiments by giving the proportions of polymer and rubber ingredients employed in preparing the compositions. The table also gives the elongation for the compositions as initially prepared, after exposure to light and the percent elongation retained.

Table V

| Run No. | Starting Materials | | Rubbery Copolymer, Percent | Product—Elongation | | |
|---|---|---|---|---|---|---|
| | Hard Polymer | | | Initial, Percent | Final, Percent | Retention, Percent |
| | Kind | Percent | | | | |
| 1 | Polyvinyltoluene | 95 | 5 | 4.7 | 3.7 | 88.3 |
| 2 | Copolymer of 75% styrene and 25% alpha-methyl styrene. | 95 | 5 | 3.7 | 3.6 | 97.2 |
| 3 | Polystyrene | 90 | 10 | 13.2 | 11.6 | 87.9 |
| 4 | Copolymer of 70% styrene and 30% acrylonitrile. | 95 | 5 | 4.7 | 4.1 | 87.2 |

EXAMPLE 6

In each of a series of experiments, molding grade polystyrene containing one percent by weight of white mineral oil as lubricant was heat-plastified and milled with a rubbery elastomer as identified in the following table to obtain a uniform mass, which was thereafter intimately blended with 0.5 percent by weight of 2,4-dinitrophenol as stabilizing agent. The compositions were injection molded to form test pieces having the dimensions ⅛ x ½ inch by 4 inches long. The compositions were tested for percent elongation employing procedures similar to those employed in Example 1. Table VI identifies the experiments by giving the percent by weight of the polymeric ingredients employed in preparing the same. The table also gives the percent elongation for the composition as initially prepared, after exposure to light and the percent of elongation retained after exposure.

Table VI

| Run No. | Starting Materials | | Polystyrene, Percent | Product—Elongation | | |
|---|---|---|---|---|---|---|
| | Rubbery Elastomer | | | Initial, Percent | Final, Percent | Retention, Percent |
| | Kind | Percent | | | | |
| 1 | Copolymer of 70% butadiene and 30% styrene. | 6.75 | 93.25 | 14.5 | 10.8 | 73.5 |
| 2 | Natural rubber | 5 | 95 | 10.4 | 7.1 | 68.2 |
| 3 | Copolymer of 40% butadiene and 60% styrene. | 5 | 95 | 3.9 | 4.5 | 100+ |
| 4 | Copolymer of 88.5% butadiene and 11.5% acrylonitrile. | 5 | 95 | 7.7 | 9.0 | 100+ |

I claim:
1. A composition of matter the essential constituents of which are a polymeric composition obtained by polymerizing from 85 to 95 percent by weight of styrene in the presence of from 15 to 5 percent by weight of a styrene-soluble rubbery copolymer of butadiene and styrene, and as a stabilizing agent for the polymer, from 0.5 to 5 percent by weight of a 2-nitrophenol having the general formula:

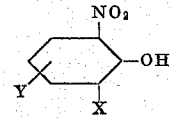

wherein one of the symbols X and Y represents a member of the group consisting of hydrogen, the nitro radical, and alkyl radicals and the other represents a member of the group consisting of hydrogen, cyclohexyl and alkyl radicals containing from 1 to 8 carbon atoms.

2. A composition as claimed in claim 1, wherein the stabilizing agent is 4,6-di-(tert.-butyl)-2-nitrophenol.

References Cited in the file of this patent
UNITED STATES PATENTS

| | | |
|---|---|---|
| 2,225,471 | Foord | Dec. 17, 1940 |
| 2,344,489 | Boyer et al. | Mar. 21, 1944 |
| 2,540,996 | Ryden | Feb. 6, 1951 |
| 2,694,692 | Amos et al. | Nov. 16, 1954 |
| 2,765,292 | Groff et al. | Oct. 2, 1956 |

OTHER REFERENCES

Cass et al.: Industrial and Engineering Chemistry, volume 46, pages 1619–1624, August 1954.